Figure 1:
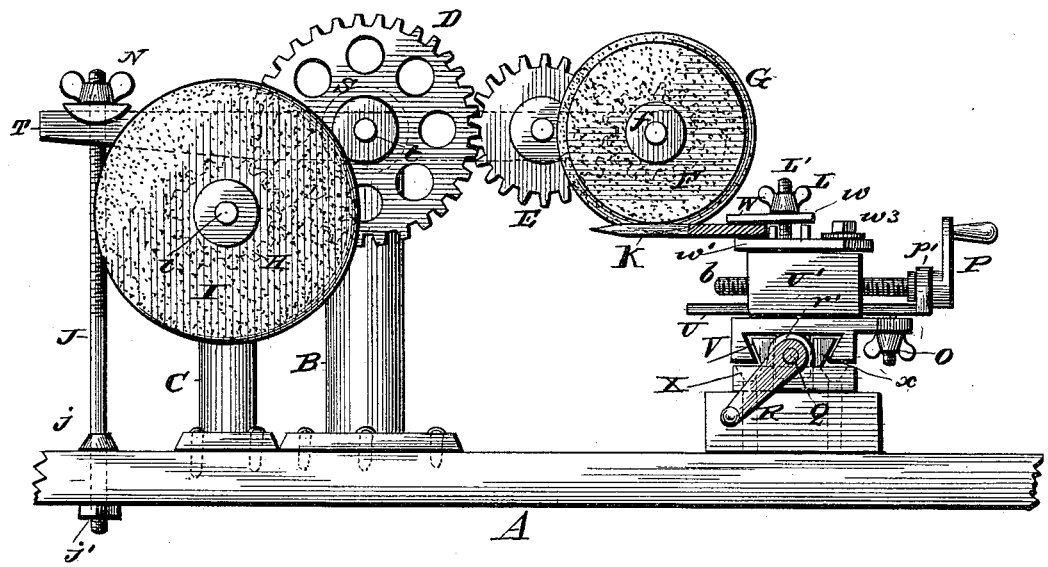

(Model.) 2 Sheets—Sheet 1.

J. F. CUSTARD.
DEVICE FOR SHARPENING REAPER KNIVES.

No. 351,426. Patented Oct. 26, 1886.

WITNESSES
Phil C. Dietrich.
J. T. Johnson.

INVENTOR
Jos. F. Custard
G. T. Oplinger
Attorney

N. PETERS, Photo-Lithographer, Washington, D. C.

(Model.)

2 Sheets—Sheet 2.

J. F. CUSTARD.
DEVICE FOR SHARPENING REAPER KNIVES.

No. 351,426. Patented Oct. 26, 1886.

WITNESSES:
Phil C. Dieterich
L. F. Johnson

INVENTOR
J. F. Custard
by W. A. Alexander
Attorney

UNITED STATES PATENT OFFICE.

JOSEPH FRANKLIN CUSTARD, OF SLATINGTON, PENNSYLVANIA, ASSIGNOR OF ONE-HALF TO JOSEPH F. HUNSICKER, OF SAME PLACE.

DEVICE FOR SHARPENING REAPER-KNIVES.

SPECIFICATION forming part of Letters Patent No. 351,426, dated October 26, 1886.

Application filed April 2, 1885. Serial No. 161,001. (Model.)

*To all whom it may concern:*

Be it known that I, JOSEPH FRANKLIN CUSTARD, a citizen of the United States, residing at Slatington, in the county of Lehigh and State of Pennsylvania, have invented a new and useful Device for Grinding Reaper-Knives, of which the following is a specification.

This invention relates to improvements in grinding-machines, being particularly adapted to grinding reaper-knives; and it has for its object to provide mechanism by which the knives can be easily and truly ground to any desired bevel or angle.

The invention consists in the construction and novel arrangement of parts hereinafter described, illustrated in the drawings, and pointed out in the claims hereto appended.

Figure 2:
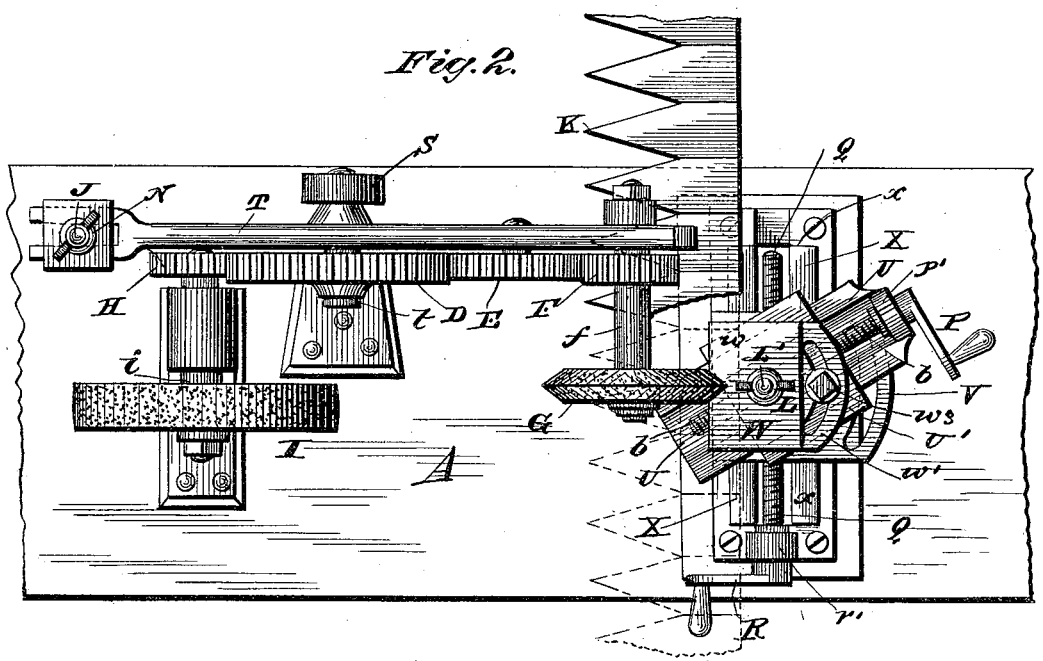
Figure 3:
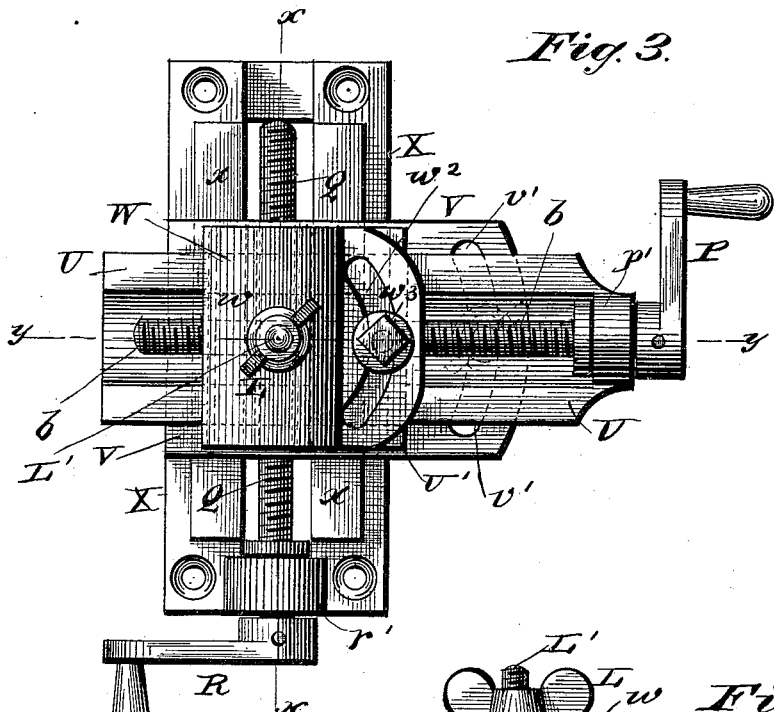
Figure 4:
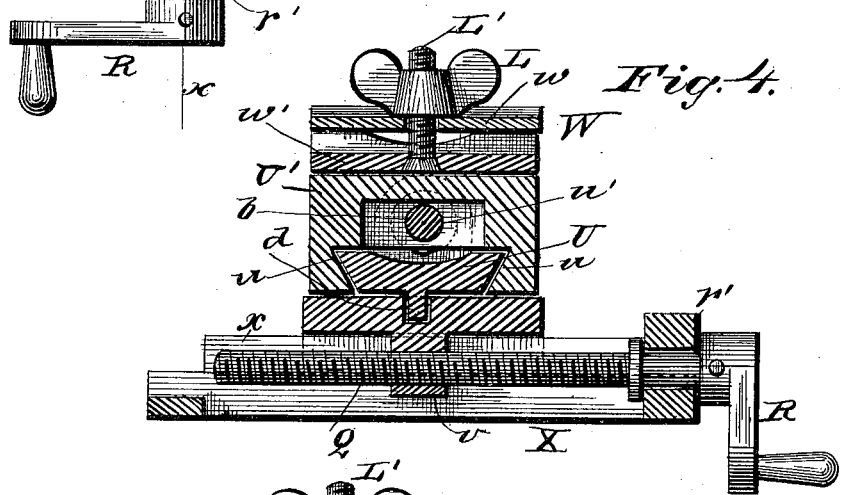
Figure 5:
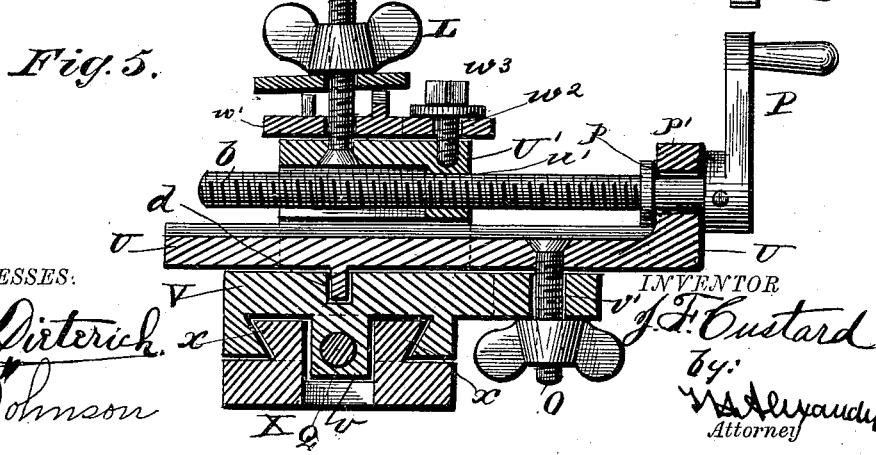

In the accompanying drawings, Figure 1 is a side elevation of the machine complete. Fig. 2 is a plan view of the same; Fig. 3, a plan view of the knife-holding mechanism enlarged; Fig. 4, a vertical section on line $x$ $x$ of Fig. 3, and Fig. 5 a vertical section on the line $y$ $y$ of the same.

Referring to the accompanying drawings, A designates the base-plate or bed of the machine, to which the standards B and C are secured by bolts passing through their bases, as shown.

T is a double armed lever, pivoted centrally upon a horizontal shaft or pin, $t$, journaled in the upper part of the standard B.

J is a vertical adjusting-rod, having its lower end secured by a collar, $j$, and nut $j'$, to the base-plate A, and its upper end passing through a proper opening near the end of the outer arm of the lever T. The said upper end is threaded and engages with a thumb-nut, N, above the lever, by which the latter can be adjusted to different heights.

D is a gear-wheel on the shaft $t$, and S a pulley on the same, which can be rotated by a belt, $s$, from any proper source of power.

E is a gear-wheel, having its shaft journaled on the lever T and meshing with the gear-wheel D.

F is a gear-wheel on a horizontal shaft or pin, $f$, journaled in the lever T, near the end of its inner arm.

G is a grindstone having a double beveled grinding-edge, $g$. It is evident that by raising or lowering the outer arm of the lever T the grindstone may be raised or lowered.

$i$ is a horizontal shaft journaled in the standard C, near the top of the same, and having secured upon it the grindstone I, and gear-wheel H, meshing with the gear-wheel D, so as to rotate the grindstone, which can be used for ordinary plane-surface grinding.

The following is the description of the knife or blade holding mechanism.

X is a supporting-block, bolted, as shown, to the base-plate, and having upon it the dovetailed projections $x$, which act as ways to correspondingly-shaped grooves in the lower surface of the plate V. $v$ is a projection depending from the plate V, midway between said grooves, into a longitudinal slot in the supporting-block X, as shown.

Q is an adjusting-screw having a crank-handle, R, upon it, and turning in a bearing, $r'$, in the end of the supporting-block. The said screw passes through a threaded opening in the projection $v$, and by its rotation moves the plate V from end to end of the supporting-block, or transversely across the machine.

U is a plate resting upon the plate V, and having a pivot pin or lug, $d$, depending from it in its central longitudinal line, and resting in a corresponding recess in the upper surface of the plate V, the said recess being in the central longitudinal line of the plate V and vertically above the screw Q.

O is a set screw passing into a threaded opening in the plate U, and through a slot, $v'$, made in the plate V, the said slot being on the arc of a circle described from the axis of the pin $d$. The edges of the plate U are dovetailed, and serve as ways for the correspondingly-shaped grooves $u$ in the lower side of a block or frame, U'. The said frame has in its end a threaded opening, $u'$, which engages with the screw $b$, having a crank-handle, P, and turning in a bearing, $p$, in an upright, $p'$, on the end of the plate U.

W is a clamping device, composed of an upper and lower plate, $w$ $w'$, respectively, both of which have corresponding openings, through which passes the set-screw L', the lower end of said screw being secured to the top of the frame U. L is a thumb-nut on the screw L', to bring the plates $w$ $w'$ together and upon the frame U'.

$w^2$ is a slot made in the lower plate, $w'$, on the arc of a circle concentric with the screw L', and $w^3$ is a set-screw passing through said slot and into the top of the frame U'.

The clamp W is to hold the reaper or other knife, the plates, screw L', and nut L enabling knives of different thickness to be held. By means of the block X and plate V the clamp can evidently be adjusted across the bed-plate to bring different blades of the knife into position, and by means of the plates U and frame U' the clamp can be moved inward longitudinally when it is desired to grind more deeply. When the transverse and longitudinal ways are at right angles, and the clamp W is set at an angle, the stone will cut a notch having different beveled edges. By then setting the clamp at the equal opposite angle the bevels can be made the same, and thus the bevel of the teeth changed. The same may be accomplished by setting the clamp straight and the ways at an angle to each other. By adjusting the clamp and ways both to an angle on the same side the amount of bevel may be further increased. The stone, by its adjustment up and down, also varies the bevel of the teeth, the lower the adjustment the longer the teeth for a constant breadth. The shortest teeth for a constant breadth will of course be when the double bevel of the stone strikes the knife in the line of the horizontal diameter of the stone.

Having described my invention, I claim—

1. The combination, with the beveled grindstone rotated by mechanism, substantially as described, of the supporting-block secured to the base-plate of the machine, the plate V, traveling in ways thereon, the frame traveling in ways upon a plate attached to the upper side of the plate V, and the clamp W, capable of adjustment at varying angles on the frame by means of the slot $w^2$ and screw $w^3$, and composed of the plates $w\ w'$, rendered adjustable in regard to each other by the screw L' and nut L.

2. In combination with a suitably-arranged grindstone, the mechanism for holding the articles to be ground, consisting of a stationary bearing-block, X, having ways $x$ for a sliding plate V, and bearings for a screw, Q, engaging a projection, $v$, on said plate, a plate, U, adjustable at various angles on plate V by means of a pivot, $d$, and a screw, $o$, playing in a slot, $v'$, in plate V, and frame U', sliding in ways on plate U and controlled by a screw, $b$, and clamp W, composed of plates $w\ w'$, adjustable at various angles on frame U, and having the retaining-screw L' and nut L, all constructed and adapted to operate substantially as and for the purpose set forth.

In testimony whereof I have hereunto set my hand this 27th day of March, 1885.

JOSEPH FRANKLIN CUSTARD.

Witnesses:
DAVID McKENNA,
JOHN S. MACK.